Dec. 17, 1929.  G. F. BEACH  1,739,497
CONVEYER FOR HIGH TEMPERATURE FURNACES
Filed March 12, 1926  3 Sheets-Sheet 1

Inventor:-
George F. Beach,
by his Attorneys,
Howson & Howson

Dec. 17, 1929.  G. F. BEACH  1,739,497
CONVEYER FOR HIGH TEMPERATURE FURNACES
Filed March 12, 1926  3 Sheets-Sheet 2

Inventor:
George F. Beach,
by his Attorneys,
Howson & Howson

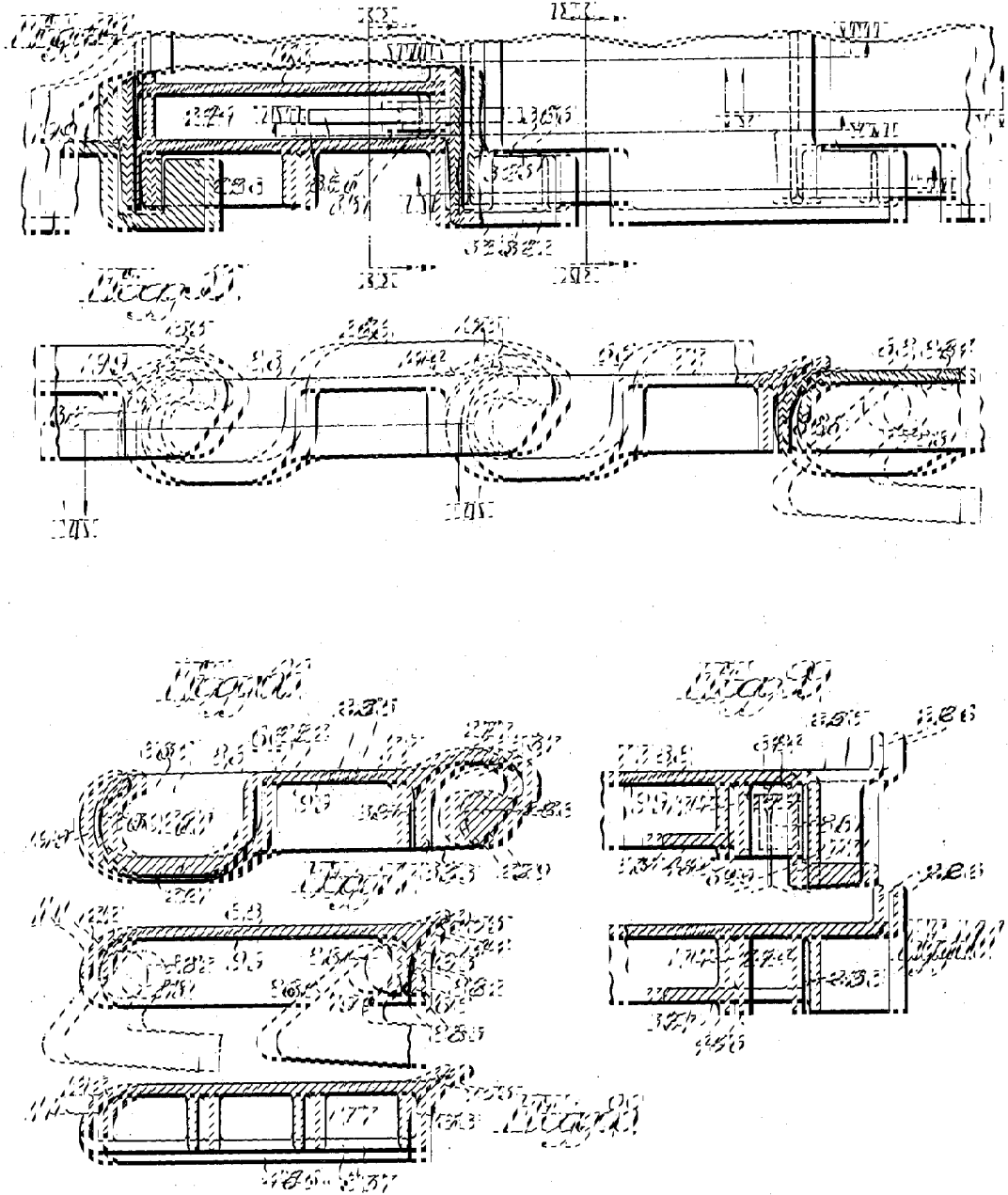

Patented Dec. 17, 1929

1,739,497

UNITED STATES PATENT OFFICE

GEORGE F. BEACH, OF PHILADELPHIA, PENNSYLVANIA, ASSIGNOR TO F. J. RYAN AND COMPANY, OF PHILADELPHIA, PENNSYLVANIA, A CORPORATION OF DELAWARE

CONVEYER FOR HIGH-TEMPERATURE FURNACES

Application filed March 12, 1926. Serial No. 94,281.

My invention relates to conveyers and it has for one object the provision of a conveyer that shall be particularly applicable to high temperature furnaces, such, for example, as are used in the heat treatment of steel.

Heretofore considerable difficulty has been experienced in high temperature furnaces with the usual form of conveyer, inasmuch as the heated conveyer parts tend to stretch under the tensile strains induced by the driving wheel.

These undesirable results are overcome in my invention by the provision of operating mechanism which pushes rather than pulls, the conveyer, so that compressive strains only are established which the conveyer is better able to withstand.

Another object of my invention is to provide a conveyer, wherein the individual pans shall be detachably interlocked in a simple and efficient manner.

Other objects and applications of my invention as well as details of construction and operation whereby my invention may be practiced, will appear more fully hereinafter, when taken in connection with the accompanying drawings, wherein Fig. 1 is a longitudinal sectional view of a conveyer embodying my invention in operative relation to a high temperature furnace;

Fig. 4 is an enlarged detail top-plan view of the conveyer pans, adjacent portions of two of the pans being shown in horizontal section to illustrate the interlocking connection therebetween as well as the operating position for the hook arms, the sectional plane being taken on the line IV—IV of Fig. 5;

Fig. 5 is a view, partially in side elevation and partially in vertical section, of the structure of Fig. 4, the sectional plane being taken on the line V—V of Fig. 4;

Fig. 6 is a detail longitudinal sectional view of one of the conveyer pans taken on the line VI—VI of Fig. 4;

Fig. 7 is a similar view taken on the line VII—VII of Fig. 4 and further illustrates in dot-and-dash lines one position of the hook arm as it is being forced from the track chamber by the rear flange of the conveyer pan.

Fig. 8 is a similar view taken on the line VIII—VIII of Fig. 4;

Fig. 9 is a transverse sectional view, the sectional plane being indicated by the line IX—IX of Fig. 4, and it further illustrates in dot-and-dash lines the sliding engagement occurring between the hook arm and the trackway during the return movement of the former; and Fig. 10 is a similar view but taken on the line X—X of Fig. 4.

Figure 1:
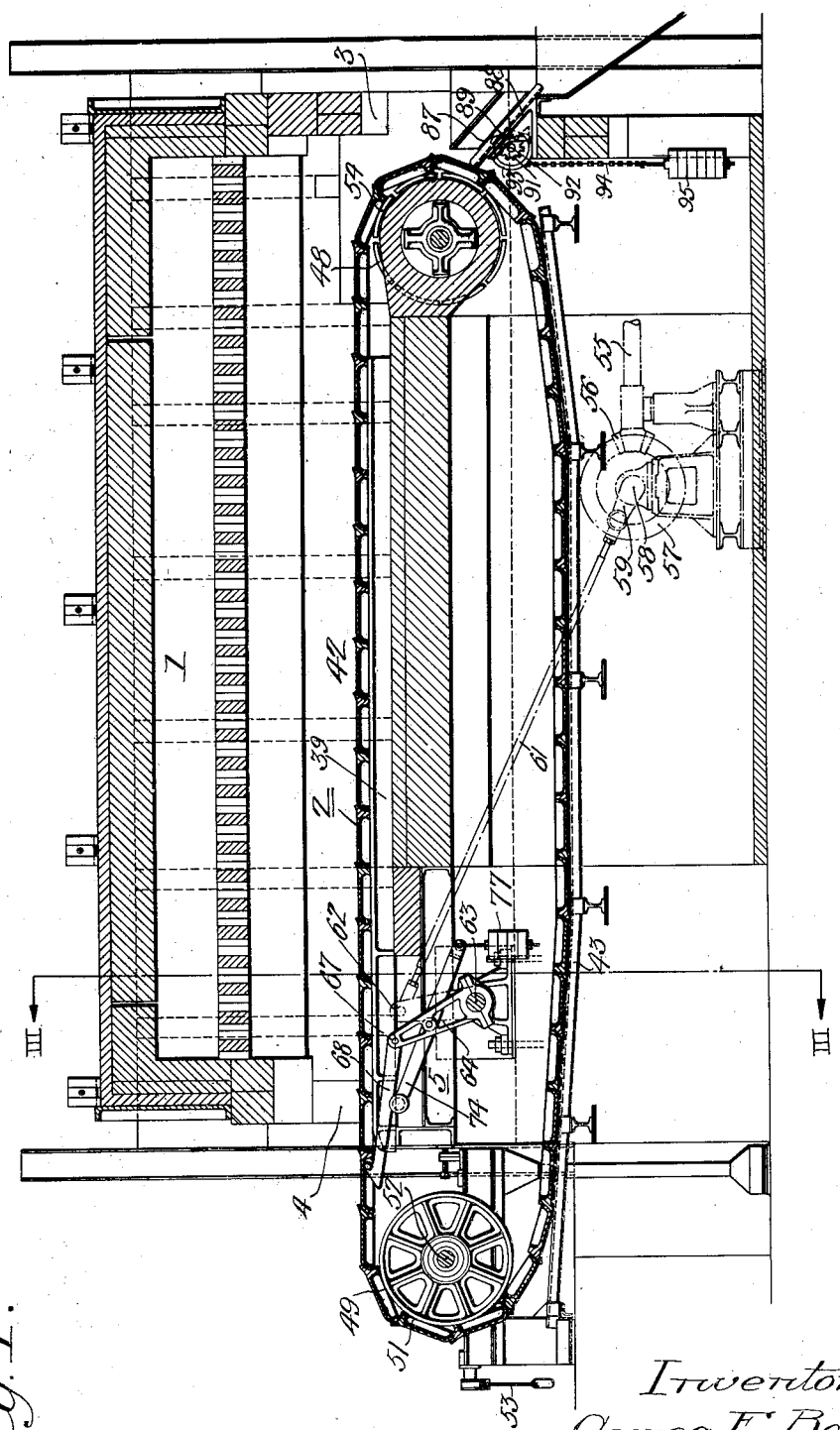

My invention broadly comprises a furnace 1, a conveyer 2 which extends from a furnace outlet 3 through a furnace inlet 4, and operating mechanism 5 whereby the conveyer belt 2 may be pushed rather than pulled and thus subjected to compressive forces only.

Referring to Figs. 3 to 10, inclusive, which illustrate in detail the structure of the conveyer belt 2, it is apparent that said belt comprises a plurality of pans 6, each of which has a substantially flat upper wall section 7 provided with an upper working surface 8 and an under surface 9. The horizontal wall section 7 is provided with a depending flange 11 of convex form at a rear edge 12 and a concave flange 13 at a front edge 14. The flange 13 has a rib portion 15 extending upwardly above the pan surface 8 and a depending portion 16, Fig. 7. The end flanges 11 and 13 extend across the width of the pan 6 and are positioned between depending side wall flanges 17 and 18 which run the length of the conveyer pan 6.

The depending end flanges 11 and 13 are so formed as to fit the complementary end flanges 13 and 11, respectively, of adjacent pans, as shown in Fig. 5;—the concave flange 13, particularly, the upper portion 15 overlapping the depending flange 11 of the adjacent conveyer pan. Thus successive conveyer pans 6 are positioned in the abutting relation necessitated by the action of the pusher mechanism 5.

Should contact be maintained between the adjacent surfaces of the abutting flanges 11 and 13 throughout the width of the conveyer pans 6, these surfaces would have to be machined in view of the fact that the conveyer pans 6 are merely rough castings. Since such machinery would be expensive, in accordance with my invention, the convex flange 11 is provided with finished portions 19—19 which are respectively positioned in substantial alignment with the side walls 17 and 18, as shown in Fig. 4. The load from one conveyer pan 6 is thus taken by the next pan at two points only which are positioned in substantial alignment with the reinforcing side walls 17 and 18. The transfer of the load at such spaced points further tends to prevent a relative turning movement between adjacent pans.

The successive pans 6 may be interlocked, other than when in a predetermined angular relation, in the manner illustrated in Figs. 4, 5 and 6, wherein a socket 20 is formed adjacent to the rear end flange 11 by a curved portion 21 of a flange 22 extending outwardly from a side flange 23. The latter is positioned outwardly of the inner side flange 17 and in such spaced relation thereto as to form a track chamber 24, for reasons as will appear more fully hereinafter. A section 25 of the flange 22, which constitutes a continuation of the socket-forming portion 21 may be positioned in substantially the plane of the upper wall sections 7 of the pan and it is provided with an upwardly extending side wall 26.

The horizontal flange section 25 may be continued by a curved portion 27 which projects forwardly from the concave wall 13 and then backwardly, terminating in an enlarged portion 28 constituting a pintle 29 which is adapted to engage a curved portion 30 of the socket 20 of a succeeding pan, as shown in Figs. 4 and 5. The curved portion 27 in effect constitutes a hook which interlocks with the complementary curved portion 30 of the next pan since the latter curved portion constitutes a reversely extending hook. The curved portion 27 may be also provided with a depending flange 31, which serves to increase the locking function of this portion.

An outer edge 32 of the curved portion 27 may be provided with a wall 33 which serves to close one side of a chamber 34 formed by said hook portion 27. The wall 33 may constitute a continuation of the pan side wall 26. Hence when the pintle 29 of one pan is positioned in the socket 20 of an adjacent pan, or in other words, the hook portion 30 of the socket 20 is interlocked with the complementary hook portion 27 of an adjacent pan, a substantially closed connection is obtained since the outer side 32 of the hook portion 27 is closed by the wall 33 and an inner side 35 thereof is closed by an adjacent portion 36 of the outer depending flange 23.

This detachable connection is also formed on the opposite side of the conveyer pan, whereby a conveyer may be obtained, the pans 6 of which are detachably interlocked in the side edges of the conveyer.

Figure 3:
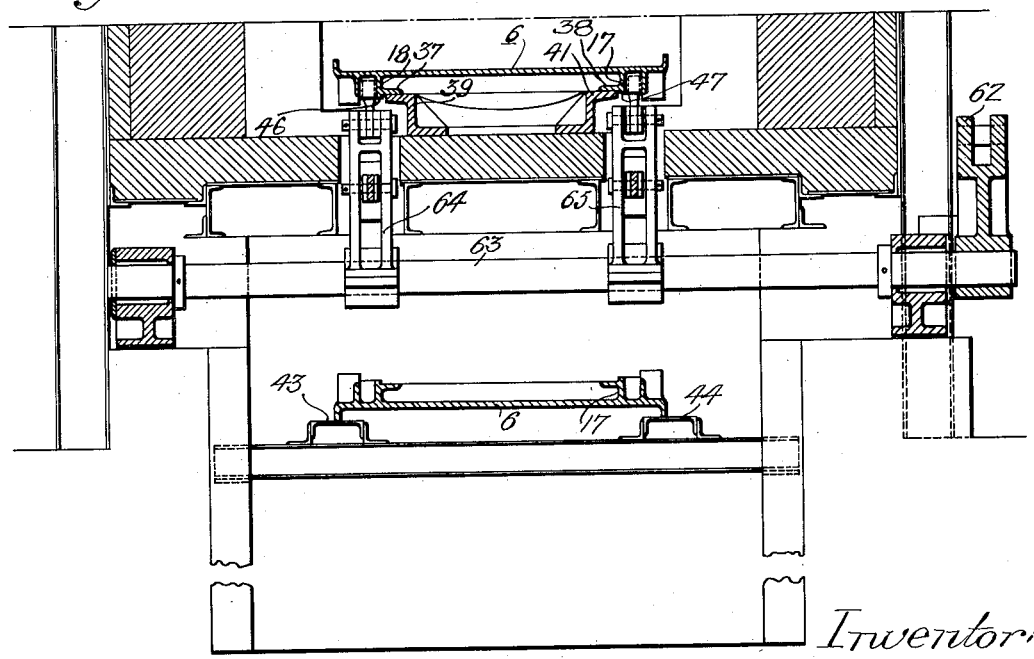
Fig. 3 is a transverse sectional view taken on the line III—III of Fig. 1.

Each of the pans 6 is provided with horizontal flange portions 37 and 38 extending from the inner side flanges 17 and 18, respectively, Fig. 3. These flanges slidably engage spaced supporting skids 39 and 41 positioned in a heated portion 42 of the furnace 1. Skids 43 and 44 positioned in a lower cooler section 45 of the furnace 1 engage the edges of the pan side walls 26. Movement of the conveyer pans 6 transversely of the longitudinally extending skids 39 and 41 may be minimized by depending flange portions 46 and 47 of the side flanges 17 and 18, respectively, as shown in Fig. 3.

The conveyer 2 may be supported at its inner end by an idler wheel 48 and at its outer end by an idler wheel 49. The outer idler wheel 49 comprises a pair of spaced wheels 51 of which only one is shown, and are so mounted on a common operating shaft 52 as to be in alignment with the skids 39 and 41, whereby the conveyer pan may be supported by the pan flanges 37 and 38, respectively. The shaft 52 may be mounted on bearings (not shown) which are adjustable longitudinally of the conveyer by means of an operating handle 53, whereby the conveyer may be sufficiently slackened to permit the removal of a pan section when necessary. The idler wheel 48 may similarly comprise a pair of wheels 54—54 which are so spaced as to constitute supporting points for the pan supporting flanges 37 and 38.

The pusher mechanism 5 for operating the conveyer 2 is illustrated in Figs. 1 to 4, 7 and 9, and it comprises a driving shaft 55 which is connected by a bevel pinion 56 meshing with a bevel gear-wheel 57 mounted on a shaft 58 having a crank arm 59 connected by a rod 61 to a crank arm 62. The crank arm 62 is mounted on one end of a shaft 63 which extends across the furnace 1 and is provided at spaced points with hook-mechanism 64 and 65 respectively operative in the track chambers 24—24, Fig. 3, positioned on the opposite sides of the conveyer pans 6. Since the mechanism 64 is similar to the mechanism 65, the former only will be described.

Figure 2:
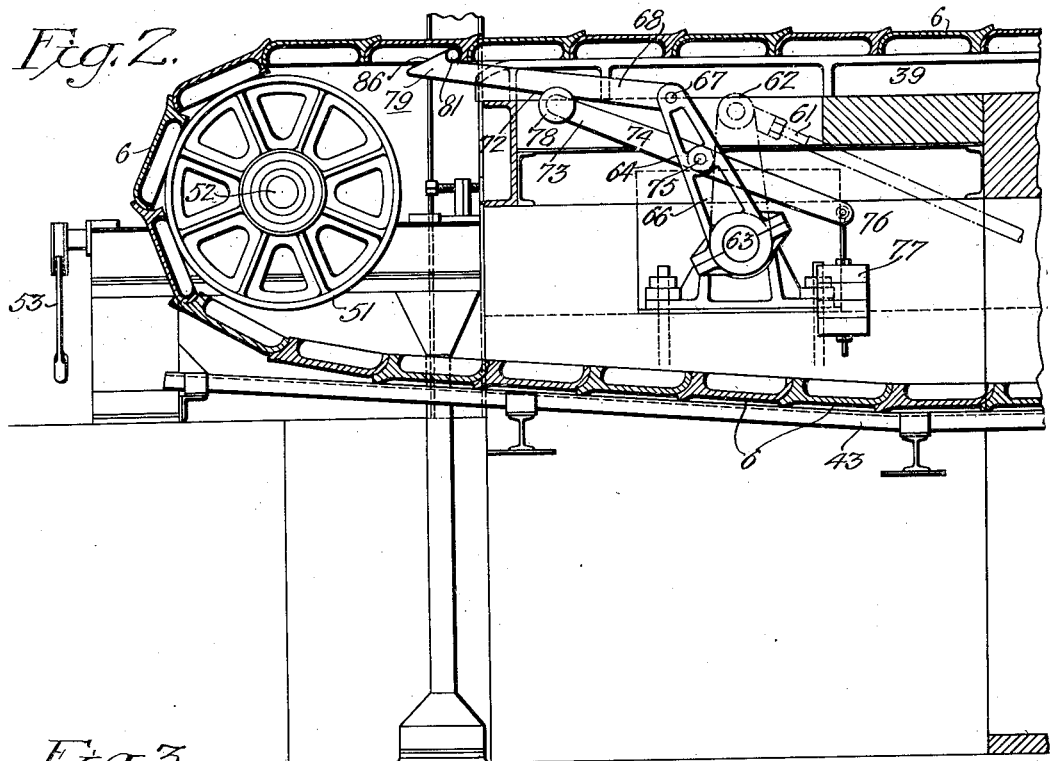
Fig. 2 is an enlarged detail view of the outer end of the conveyer belt together with the operating mechanism therefor, the conveyer belt only being shown in section.

As illustrated particularly in Fig. 2, the mechanism 64 comprises a crank arm 66 which extends upwardly from the shaft 63 and providing a pivotal mounting 67 at the outer end thereof for a hook arm 68. The latter comprises an elongated member having substantially flat sides 69 and 71, Fig. 9, and an underside 72, the latter slidably engaging one end 73 of a floating lever 74, that is pivotally mounted at a point 75 on the crank arm 66 intermediate the shaft 63 and the pivotal mounting 67. An opposite end 76 of the arm 74 is provided with a freely swinging weight 77, whereby the end 73 may exert a predetermined upward force on the hook arm 68 for all positions of the latter. A pair of plates 78 are so mounted on the end 73 of the floating lever as to engage respectively the opposite sides 69 and 71 of the hook arm 68, so that the latter may be retained in operative relation to the floating lever 74 for the various positions thereof.

The arm 68 terminates in a hook portion 79, Figs. 7 and 9, which is provided with an enlarged abutment 81 having a curved surface 82 adapted to engage a complementary curved portion 83 of the front flange 13 positioned between the side wall flanges 17 and 23. The curved surface 82 is also movable during the return stroke of the hook arm 68 over a track 84 in the track chamber 24, said track 84 constituting an under surface portion of the conveyer pan that is positioned between the side flanges 17 and 23, all as will presently appear.

In order that the hook portion 79 of the arm 68 may be more easily forced from the track chamber 24 during its return stroke, a side 86 of said hook portion 79 is beveled from a point on the head portion 81 to a point below the flanges 11 and 13. Thus when the hook 79 has been moved by the crank arm 66 from the solid-line position shown in Fig. 7, to the dot-and-dash line position, the continued movement of the same results in the sliding of the bevel side 86 over the end flange 11 and the consequent removal of the hook portion 79 from the track chamber 24 against the upward force of the floating lever 74. A further return movement of the hook arm 68 results in the hook portion 79 being actuated into the track chamber 24 of the next preceding conveyer pan 6, the enlarged head portion 81 being now in engagement with the front flange 13 thereof.

In operation, assuming the parts in the position shown in Fig. 1, wherein the hook arm 68 is abutting against the end portion 83 of the track chamber 24, the turning of the operating shaft 63 an amount controlled by the throw of the crank arm 59 causes a corresponding forward movement of the hook member 68 and consequently the conveyer 2. The subsequent movement of the crank arm 59 causes an opposite movement of the shaft 63 and hook arm 58, with the result that said hook arm is actuated from its forward position to its rear position wherein it engages the track end portion 83 of the next preceding conveyer pan 6. During the first part of this rearward or return movement, the head portion 81 of the hook arm 68 is held in engagement with the track 84 by the upward thrust of the floating lever 74. However, when the hook portion 79 is actuated out of the track chamber 24 and subsequently into the track chamber of the next preceding conveyer pan, the bevel side 86 thereof engages the rear flange 11. During this movement, proper alignment is maintained between the hook arm 68 and the floating lever 74 by means of the side plates 78 on the end of said floating lever. A further movement of the crank arm 59 again causes the forward movement of the hook arm 68 and consequently the conveyer 2. Thus, the conveyer pans 6 are moved step by step through the heated portion 42 of the furnace, finally discharging the material received at the entrance end 4 unto a chute 87 extending through the furnace outlet 3.

As shown in Fig. 1, the chute 87 is preferably slidably mounted in ways 88, whereby it may be moved toward and from the conveyer pans 6. An underside of the chute 88 is provided with gear-teeth 89 which mesh with the teeth of a gear-wheel 91 mounted on a rotatably mounted shaft 92 carrying a drum 93. The latter carries a chain 94 terminating in a weight 95, whereby the gear-wheel 91 may be turned so as to cause the inner end of the chute 87 to engage normally the outer surface 8 of the conveyer pans 6. When the raised flange portion 15 of the conveyer pans 6 engage the chute 87, the latter is moved outwardly against the force of the weight 95 returning, however, when released by the flange portion 15. One advantage of causing such sliding engagement between the chute 87 and conveyer pans 6 is that it prevents material which tends to stick to the pans from being carried around to the lower furnace chamber 61.

While I have shown only one embodiment of my invention, for the purpose of describing the same and illustrating its principles of construction and operation, it is apparent that various changes and modifications may be made therein without departing from the spirit and scope of my invention and I desire, therefore, that only such limitations shall be imposed thereon as are indicated in the appended claims or as are demanded by the prior art.

I claim:

1. A continuous conveyer belt having a plurality of spaced ribs extending from the surface thereof, idler wheels positioned at the ends of said belt, a bodily movable plate so positioned at one end of said conveyer that it is projected by said ribs away from the surface of said conveyer, means tending to return said member to its original position, and operating means for said conveyer belt independent of said idler wheels.

2. Operating means comprising an operating arm, a hook pivotally mounted on said operating arm, and a floating lever pivotally mounted on said operating arm and adapted to engage said hook with a predetermined force.

3. Operating means comprising a movable member, a hook pivotally mounted on said movable member, and a lever pivotally mounted on said member, one end of said lever being weighted, whereby the other end thereof may exert a desired force on said hook.

4. A hook, a shaft, an arm mounted on said shaft constituting a pivotal supporting point for said hook, and a floating lever pivotally mounted on said arm, said lever having one end weighted, whereby the other end thereof may exert a predetermined force on said hook.

5. Operating means comprising a hook, a shaft having an arm providing a pivotal support for said hook, a floating lever pivotally mounted on said arm, and a weight attached to one end of said lever, whereby the other end thereof may exert a desired upward force on said hook.

6. Operating means for a conveyor belt comprising a hook, a crank arm providing a pivotal mounting for said hook, a lever pivotally mounted on said crank arm having means whereby an upward force may be exerted on said hook, and means for maintaining said hook and said lever in said co-operating relation upon a relative movement therebetween.

7. A crank arm having a hook pivotally mounted on one end thereof, and a floating lever pivotally mounted on said crank arm at an intermediate point, one end of said floating lever normally engaging said hook under a force tending to rotate said floating lever about its pivot on said crank arm.

8. A pair of hooks, a shaft, a pair of crank arms mounted on said shaft and respectively providing pivotal supporting points for said hooks, and floating levers respectively mounted on said crank arms, each lever being weighted at one end, the other end being in operative relation to the hook, and having means for maintaining said hook and said lever in said co-operating relation upon a relative movement therebetween.

9. A shaft having a crank arm, an arm pivotally mounted thereon, said arm being provided with a hook portion, and a floating lever pivotally mounted on said crank arm and adapted to exert a desired upward thrust on said hook arm.

10. Operating mechanism for a conveyer comprising a pair of hook arms pivotally mounted on crank arms, respectively, each crank arm having a floating lever pivotally mounted thereon, one end of said lever having a weight attached thereto, whereby the other end thereof may normally engage the hook arm with a desired force, and means for maintaining said hook arms in predetermined operative planes upon movements thereof relative to said floating levers.

11. A shaft having a pair of crank arms, a pair of hook arms respectively mounted on said crank arms, a floating lever for each crank arm and pivotally mounted thereon intermediate said shaft and the hook mounting, a weight on one end of said floating lever operative to cause the other end thereof to engage the hook lever with a predetermined force, and plates carried by said floating lever for respectively engaging the opposite sides of said hook arm, whereby the latter may be maintained in predetermined relation to said floating lever upon a relative movement therebetween.

12. A conveyer pan having a track terminating in an abutment at one end and also provided with a flange at the other end, and an operating hook member mounted for reciprocatory movement relative to said pan and having one portion thereof formed to engage said abutment, another portion thereof being beveled so that said hook member may be depressed as said flange engages the same.

13. A conveyer pan having a track terminating in an abutment, a hook adapted to move over said track and to engage said abutment, a shoulder formed at the other end of said track, said hook having one side thereof so beveled that upon a movement of the same into engagement with said shoulder said hook is moved downwardly out of engagement with said track.

14. A pair of conveyer pans having flanges at the opposite ends thereof, adjacent flanges being in abutting relation, each pan being provided with a track extending between the flanges thereof, and an operating member having a path of travel extending along said track from one flange to the other.

15. A conveyer belt comprising a plurality of pans, each pan being provided with flanges, the flanges of one pan being in abutting relation to the flanges of adjacent pans, and operating means for said conveyer belt, said means comprising a reciprocatory member having a path of travel substantially extending from the flange of one pan to adjacent flange of another pan.

16. A conveyer comprising a plurality of pans provided with flanges in abutting relation and also having tracks extending between the flanges of each pan, and operating means for said conveyer, said means comprising a member having predetermined forward and reverse strokes, said member during its forward stroke abutting against the flange of one pan but movable on its reverse stroke over said track and into engagement with the flange of a succeeding pan, said member having a beveled surface whereby it may be depressed as it passes from one track to the other.

17. A conveyer comprising a plurality of pans, each pan having flanges positioned to abut against the flanges of adjacent pans and also having a track open from the underside thereof, and operating means for said conveyer, said means comprising a hook having means tending to maintain the same in engagement with said track, said hook being so formed that during its return stroke it is forced out of engagement with said track by one of said flanges.

18. A conveyer comprising a plurality of pans, means for interlocking successive pans, tracks formed on said pans, and operating means including a hook movable over at least one of said tracks during one of its strokes, but adapted on another stroke to actuate the conveyer.

GEORGE F. BEACH.